Jan. 22, 1963

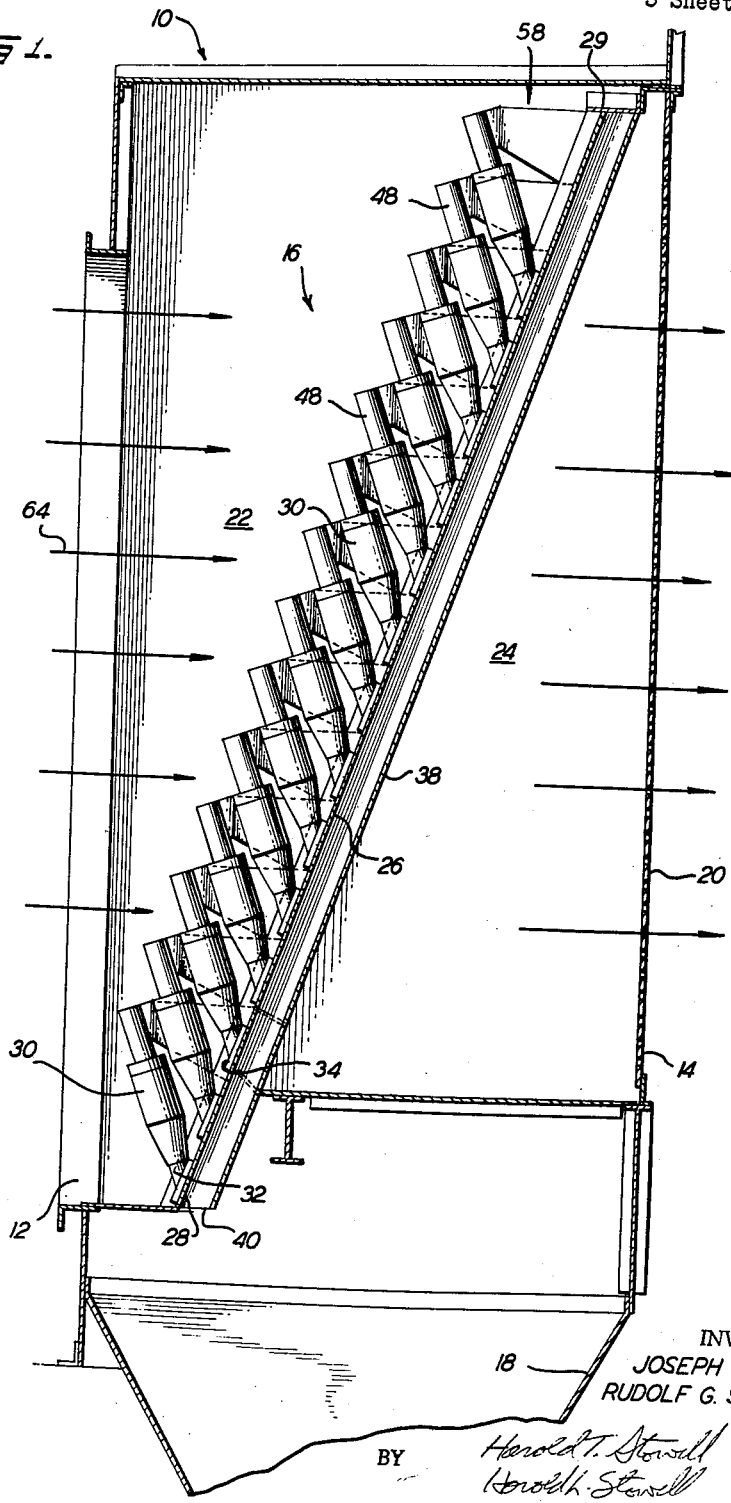

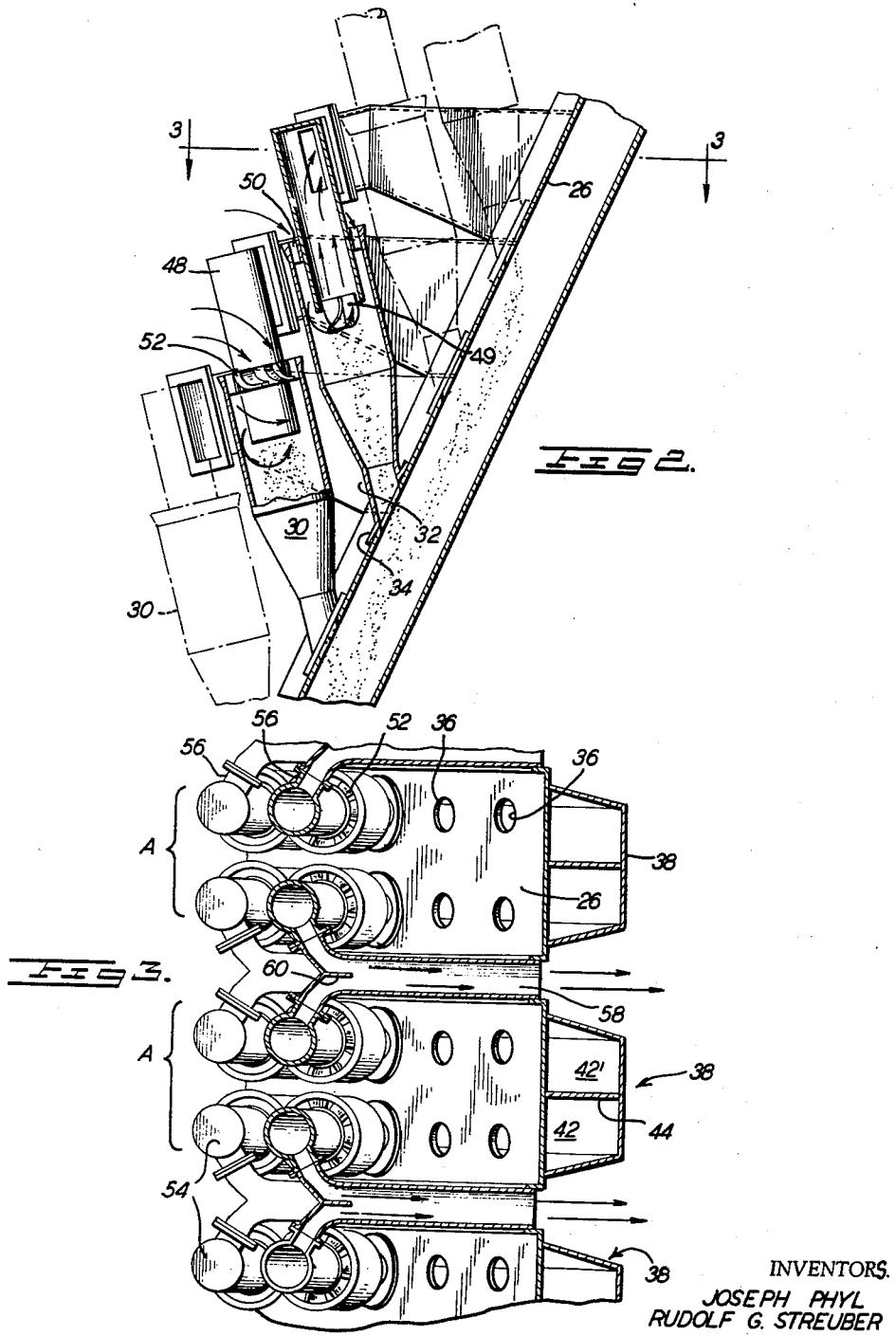

J. PHYL ET AL 3,074,219

MECHANICAL DUST COLLECTOR

Filed May 26, 1960

INVENTORS
JOSEPH PHYL
RUDOLF G. STREUBER

BY Harold T. Stowell
Harold L. Stowell

ATTORNEYS

3,074,219
MECHANICAL DUST COLLECTOR
Joseph Phyl, Fanwood, and Rudolf G. Streuber, Somerville, N.J., assignors to Research-Cottrell, Inc., Bridgewater, N.J., a corporation of New Jersey
Filed May 26, 1960, Ser. No. 31,943
5 Claims. (Cl. 55—348)

This invention relates to an improved mechanical collector for the separation of gas suspended materials. More particularly, the invention relates to an improved mechanical collector comprising a plurality of individual cyclone-type separator tubes arranged in superimposed position to form a single collector unit.

It is a particular object of the present invention to provide a cyclone-type collector unit which may be advantageously employed in conjunction with other gas cleaning means and which only requires a minimum of space before or after such other gas cleaning means.

A further object is to provide a mechanical collector wherein the gas flow to the collector tubes is substantially unrestricted, assuring substantially equal loading of gas to the plural tubes of the assembly.

Another object of the present invention is to provide a mechanical collector unit wherein the outlet ducts from the units are shaped to provide improved horizontal gas discharge.

A further object is to provide a mechanical dust collector unit wherein the collector tubes are fully exposed to the gas stream to maintain the collectors at an even temperature approaching the gas temperature for optimum collecting efficiency.

These and other objects and advantages are provided by the centrifugal dust collector which, in general, comprises a housing having a gas inlet and a gas outlet, a transverse wall member in the housing dividing the housing into an upstream and a downstream chamber, means cooperating with the wall member to define dust channels communicating with a dust receiver below the housing, a plurality of centrifugal separator devices, each including a separator tube, an outlet tube concentrically mounted in the separator tube and means imparting vortical motion to gas entering the separator tube, said separator devices being positioned in the upstream chamber of the housing with the lower ends of the separator tubes projecting into the dust channels, and duct means connecting the outlet ends of the outlet tubes to the downstream chamber of the housing.

The invention will be more particularly described in reference to the illustrative embodiments thereof in which:

FIG. 1 is a vertical sectional view of a preferred form of the mechanical collector of the invention employed in a housing adapted for horizontal gas flow;

FIG. 2 is an enlarged fragmentary vertical sectional view of a portion of the mechanical collector unit illustrated in FIG. 1;

FIG. 3 is a fragmentary horizontal sectional view substantially on line 3—3 of FIG. 2;

Figure 4:
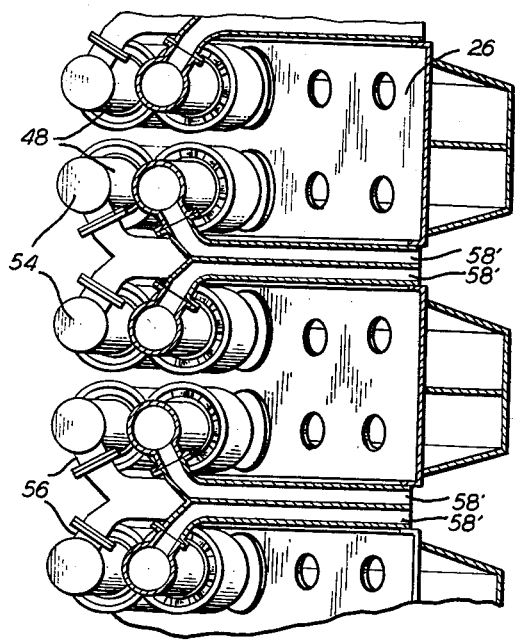
FIG. 4 is a view similar to FIG. 3 of a modified form of the present invention showing each outlet tube with its own gas discharge conduit.

Referring to the drawings, 10 generally designates a flue or housing for directing gas to be cleaned from a source thereof through the cleaning apparatus. The flue section 10 includes an inlet 12 for the gas to be cleaned and an outlet 14 for the gases after they have passed through the mechanical collecting unit generally designated 16. Positioned at the lower end of the flue section 10 is a conventional collected material storage hopper 18 which communicates with the mechanical collecting unit as to be more fully described thereinafter.

The mechanical collecting unit illustrated in the drawings is adapted to collect gas-borne particles prior to the entry of the gas stream into a conventional electrostatic precipitator. Therefore, the gas outlet 14 is provided with a perforated gas distribution baffle means 20 which aids in maintaining a uniform distribution of gas through a transverse section of the flue 10.

The housing or flue section 10 is divided into an upstream chamber 22 and a downstream chamber 24 by a transverse wall member 26. In the illustrated form of the invention, the transverse wall 26 is diagonally disposed within the housing 10 with the lower end 28 thereof positioned upstream with respect to the upper end 29.

In the illustrated form of the invention, the wall member 26 slopes at an angle of about 70° to the horizontal. However, it will be appreciated by those skilled in the art that while preferably the wall member 26 may be arranged at an angle varying from about 60° to about 80° to the horizontal, the collector of the present invention may have a substantially vertical wall adapted to carry the plural collector tubes.

Secured to the wall 26 is a plurality of separator tubes 30 having their lower converging ends 32 provided with cylindrical flange means 34 adapted to be secured about openings 36 in the wall member 26.

The openings 36 in wall 26 of the form of the invention shown in FIGS. 1–3 are grouped in pairs of upwardly sloping rows as indictaed at A in FIG. 3. The spacing between the centers of the openings of each pair would vary with the diameter of the separator tubes, and with 10-inch diameter separator tubes 1 foot between centers is satisfactory and the spacing between the centers of the openings of adjacent pairs of upwardly sloping rows for such 10-inch tubes may be about 1½ feet. The horizontal spacing of the rows may be uniform, as illustrated, with the distance between the centers of openings in adjacent horizontal rows being about 1 foot for the illustrated 10-inch diameter separator tubes.

The openings 36 in the wall 26 provide for the passage of material separated in the separator tubes 30 to dust chute means generally designated 38. The chute means 38 extend along the downstream face of the wall means 26 and have their open lower ends 40 positioned to discharge the collected material into the hopper structure 18 positioned therebelow. Also, as illustrated, each dust chute means 38 may be divided into a pair of dust passages 42 and 42' by a longitudinally extending wall 44 whereby one dust chute means 38 collects the material discharged from the separator tubes 30 from a pair of sloping rows of collectors.

While the dust chutes 38 have been illustrated as being provided on the downstream side of the wall 26, it will be apparent that the chute means could be positioned on the upstream side of the wall 26 without departing from the principles of this invention.

Each of the separator tubes 30 receives in its upper end a corresponding outlet tube generally designated 48. Each gas outlet tube 48 is concentrically mounted in the upper end of its cooperating separator tube 30 and is of a smaller diameter than its separator tube to provide an annular gas inlet passage 50 between the inner wall of the separator tube 30 and the outer wall of the outlet tube 48. Within the annular gas inlet is provided a plurality of gas spinning vanes 52 adapted to impart whirling motion to the gas stream to be cleaned.

While vane members 52 are illustrated as the means for imparting vortical movement to the gas stream entering the separator tubes, other forms of gas spinning means may be employed with the mechanical separator units 16. For example, tangential inlet type gas whirling means may be employed in the system of the invention.

The outlet tubes 48 may be provided with pressure recovery vanes as illustrated at 49 on one of the outlet tubes 48 shown in FIG. 2.

The upper end of each of the gas outlet tubes 48 is closed by a roof portion 54 and each of the outlet tubes 48 is provided with an offtake conduit 56 which communicates with a gas outlet passage 58 for directing the gas passing through a pair of separators through the wall means 26 to the downstream chamber 24. In the illustrated form of the invention, one duct 58 has connection to a pair of outlet conduits 56 and at the juncture of the two outlet conduits with the main passage in the duct 58 there is provided a short gas flow directing plate 60 to reduce the formation of eddy currents and the like where the gas streams from a pair of adjacent outlet tubes flow into the common passage in the ducts 58. Also, as illustrated in the drawings, the cross-section of the ducts 58 is quadrangular to provide for even horizontal discharge of the gas issuing from the outlet tubes into the downstream chamber 24 of the centrifugal dust collecting housing. Further, the height of each gas discharge conduit 58 at the discharge end thereof is such that substantially the entire length of the wall 26 between adjacent dust chute means 38 comprises gas outlet passages.

While a pair of tubes is provided with a common gas outlet duct 58, the objects of the present invention would be fully accomplished where each tube is provided with its own outlet duct connecting its outlet tube 48 with the downstream chamber 24 or a greater number than two outlet tubes may be connected to a single gas discharge conduit 58.

In operation of the mechanical separator illustrated in FIGS. 1-3 of the drawings, gas containing suspended particulate material enters the flue section 10 through the inlet opening 12 as illustrated by the directional arrows 64. The gas stream is then directed into each of the separator tubes 30 about the gas spinning vanes 52, as more clearly illustrated in FIG. 2 of the drawings. The whirling gas stream moving down the separator tubes 30 throws the suspended particulate material adjacent the inner wall of the separator tube while the gas turns and passes up the outlet tubes 48, thence into the gas outlet conduits 58 via the offtake ducts 56. The particulate material adjacent the inner wall of each separator tube falls to the outlet thereof and into the dust chute means 38 to be discharged into the collecting hopper 18 while the gases with the particulate material removed therefrom flow through the downstream chamber 24 and the distributing plate 20, to be discharged into the atmosphere or to further gas cleaning apparatus of the electrical, mechanical or bag types.

As hereinbefore discussed, each of the outlet tubes 48 may be provided with its own outlet passage for directing the cleaned gas through the wall member 26. This form of construction is illustrated in FIG. 4 of the drawings wherein like parts are provided with the same reference numbers employed in describing the form of the invention illustrated in FIGS. 1 through 3. Referring to FIG. 4, it will be seen that each of the outlet tubes 48 is provided with a top or roof portion 54 and an off-take conduit 56. Each of the off-take conduits 56 communicates with a gas outlet passage 58' for directing the gas, passing through the separator, through the wall means 26 and into the downstream chamber of the gas cleaning apparatus.

Figure 5:
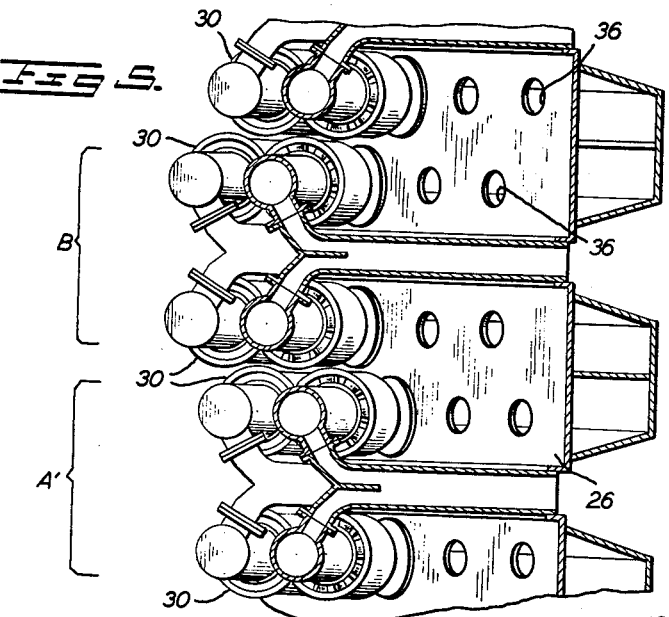
FIG. 5 is a view similar to FIG. 3 of a modified form of the present invention wherein the generally vertical rows of openings in the tube sheet are offset in adjacent pairs of rows.

In the form of the invention illustrated in FIGS. 1 through 3, the horizontal spacing of the rows of separator tubes is uniform. In FIG. 5 of the drawings, a modified form of the invention is illustrated wherein separator tubes of adjacent pairs of rows are positioned in staggered relation, thus permitting the installation of a greater number of collector tubes in a housing of a given width. As illustrated in FIG. 5, separator tubes 30 are mounted about openings 36 in the wall member 26. The openings 36 in the wall member 26 are arranged in pairs of generally upwardly sloping rows designated A' and B. The openings in rows A' are positioned intermediate the openings in rows B permitting closer packing of the separator tubes without interfering with the novel expedient of connecting the off-take tubes with ducts for directing the gas passing through a pair of separators through the wall means 26 to the downstream chamber of the separator device. While only one form of staggered arrangement for the separator tubes is illustrated, it will be appreciated by those skilled in the art that other arrangements may be made without departing from the teachings of the present invention.

From the foregoing description, it will be seen that the described mechanical collector fully accomplishes the aims, objects and advantages hereinabove set forth and that, while the invention has been described in detail with reference to a collector having a horizontal gas inlet, it will be apparent that a vertical gas inlet may be employed without adversely affecting the efficient gas distribution provided by the spaced superposed rows of dust collectors.

We claim:

1. A centrifugal dust collector comprising a housing having a gas inlet and a gas outlet, a transverse wall member in said housing dividing the housing into an upstream and a downstream chamber, means cooperating with said wall member to define dust channels communicating with a dust receiver below said housing, a plurality of generally vertically extending centrifugal separator devices, each including a separator tube having an inlet, a gas outlet tube concentrically mounted to extend from the upper end of said separator tube and means for imparting vortical motion to gas entering the separator tube, said separator devices being positioned in said upstream chamber with the lower ends of the separator tubes projecting into said dust channels, said dust channels disposed on the downstream side of the inlets of said separators, and duct means connecting the outlet ends of the outlet tubes to the downstream chamber through said wall member.

2. A centrifugal dust collector comprising a housing having a gas inlet and a gas outlet, a transverse wall member in the housing dividing the housing into an upstream and a downstream chamber, said wall member being angularly disposed with respect to the horizontal with the lower end thereof positioned upstream with respect to the upper end, means cooperating with the wall member to define dust channels communicating with a dust receiver below said housing, a plurality of centrifugal separator devices angularly disposed with respect to the horizontal and having an upper and a lower end, each including a separator tube having an inlet and an outlet tube concentrically mounted to extend from the upper end of said separator tube and means for imparting vortical motion to the gas entering the separator tube, said separator devices being positioned in the upstream chamber with the lower ends of the separator tubes projecting into said dust channels which are disposed downstream with respect to the inlets for said separator tubes, and duct means connecting the outlet ends of the outlet tubes to the downstream chamber through said wall member.

3. A centrifugal dust collector comprising a housing having a gas inlet and a gas outlet, a transverse wall member in the housing dividing the housing into an upstream and a downstream chamber, said wall member being angularly disposed with the lower end thereof positioned upstream with respect to the upper end, means cooperating with the wall member to define dust channels communicating with a dust receiver below said housing, said means cooperating with the wall member to define the dust channels including a plurality of generally vertically extending conduits secured to said wall member and on the downstream side thereof, a plurality of generally vertically extending centrifugal separator devices, each including a separator tube and an outlet tube concentrically mounted to extend from the upper end of said separator tube and means for imparting vortical motion to the gas entering the separator tube, said separator devices being positioned in the upstream chamber with the lower ends of the separator tubes projecting through said wall member into said dust channels and duct means connecting the outlet ends of the outlet tubes to the downstream chamber through said wall member.

4. A centrifugal dust collector comprising a housing having a gas inlet and a gas outlet, a transverse wall member in the housing dividing the housing into an upstream and a downstream chamber, said wall member being disposed at an angle of from about 60° to about 80° to the horizontal with the lower end thereof positioned upstream with respect to the upper end, means cooperating with the wall member to define dust channels communicating with a dust receiver below said housing, said means cooperating with the wall member to define the dust channels including a plurality of generally vertically extending conduits secured to said wall member and on the downstream side thereof, a plurality of generally vertically extending centrifugal separator devices, each including a separator tube and an outlet tube concentrically mounted to extend from the upper end of said separator tube and means for imparting vortical motion to the gas entering the separator tube, said separator devices being positioned in the upstream chamber with the lower ends of the separator tubes projecting through said wall member into said dust channels and duct means connecting the outlet ends of the outlet tubes to the downstream chamber, each of said duct means having communication with said outlet tubes through a plurality of conduit means, each of said conduit means connecting at least the outlet tubes of a pair of adjacent ones of said separator devices.

5. A centrifugal dust collector comprising a housing having a gas inlet and a gas outlet, a transverse wall member in the housing dividing the housing into an upstream and a downstream chamber, said wall member being disposed at an angle of from about 60° to about 80° to the horizontal with the lower end thereof positioned upstream with respect to the upper end, means cooperating with the wall member to define dust channels communicating with a dust receiver below said housing, said means cooperating with the wall member to define the dust channels including a plurality of generally vertically extending conduits secured to said wall member and on the downstream side thereof, a plurality of generally vertically extending centrifugal separator devices, each including a separator tube and an outlet tube concentrically mounted to extend from the upper end of said separator tube and means for imparting vortical motion to the gas entering the separator tube, said separator devices being positioned in the upstream chamber with the lower ends of the separator tubes projecting through said wall member into said dust channels and duct means connecting the outlet ends of the outlet tubes to the downstream chamber, each of said duct means having communication with an outlet tube.

References Cited in the file of this patent

UNITED STATES PATENTS

| | | |
|---|---|---|
| 2,533,991 | Blomquist et al. | Dec. 12, 1950 |
| 2,647,588 | Miller | Aug. 4, 1953 |
| 2,701,570 | Eissmann | Feb. 8, 1955 |
| 2,713,920 | Phyl | July 26, 1955 |
| 2,854,092 | Gustavsson | Sept. 30, 1958 |
| 2,963,109 | Brookman et al. | Dec. 6, 1960 |
| 2,976,130 | Hedberg et al. | Mar. 21, 1961 |

FOREIGN PATENTS

| | | |
|---|---|---|
| 98,710 | Sweden | Apr. 23, 1940 |
| 328,652 | Great Britain | May 2, 1930 |
| 402,693 | Great Britain | Dec. 7, 1933 |
| 551,709 | Belgium | Oct. 31, 1956 |
| 1,034,925 | France | Apr. 15, 1953 |
| 1,090,290 | France | Oct. 13, 1954 |